United States Patent [19]

Yamada

[11] 4,444,475
[45] Apr. 24, 1984

[54] MICROSCOPE WITH PROJECTOR

[75] Inventor: Toshikatsu Yamada, Tokyo, Japan

[73] Assignee: K.K. Yamada Kogaku Seisaku, Tokyo, Japan

[21] Appl. No.: 334,788

[22] Filed: Dec. 28, 1981

[51] Int. Cl.³ .............................................. G02B 21/36
[52] U.S. Cl. ................................................. 350/508
[58] Field of Search ........................ 350/502, 507–508, 350/511, 500, 538, 576; 353/71–74; 356/391; 354/79

[56] References Cited

U.S. PATENT DOCUMENTS 2,170,967  8/1939  Eppenstein et al. ................. 350/508
3,545,355  12/1970  Cahall, Jr. .............................. 354/79

FOREIGN PATENT DOCUMENTS 1920921  9/1971  Fed. Rep. of Germany .
2311191  5/1974  Fed. Rep. of Germany .

OTHER PUBLICATIONS

Davis et al. "An Easily Constructed Microprojector for Drawing Purposes", *The American Biol. Teacher*, 10-1953, pp. 150-151.
Zeiss, Catalogue–"Routine & Research Microscopes", 10-1964 p. 23.
Bausch & Lomb, Catalogue–"Microscopes & Accessories for Educational Institutions" 1927, *Bausch & Lomb Optical Co.* Rochester N. Y., U.S.A. p. 31.

Primary Examiner—William H. Punter

[57] ABSTRACT

A microscope having a projecting device which is adapted to be used together with a reflecting mirror as a reflecting light source and a lamp disposed on the backside of the mirror as a direct light source characterized by that a hood is arranged instead of the eye lens of a microscope body and is provided with reflecting mirrors disposed therein, a projecting plate disposed removably to project a reflecting light, and a reflecting mirror disposed pivotably to project the reflecting light outwards.

7 Claims, 2 Drawing Figures

MICROSCOPE WITH PROJECTOR

BACKGROUND OF THE INVENTION

The present invention relates to a microscope having a projecting device which is capable of projecting an image of a microscope and also projecting the magnified image outside the microscope.

In a case when observing an object by means of a microscope, it is often desired not only to look carefully at its magnified image but to make a copy of the latter. However, in the prior art microscopes, it is very inconvenient to sketch the magnified image because no particular means for sketching such a magnified image is provided.

The present invention is developed in the light of such circumstances and is intended to eliminate the above defects by that a microscope is provided with a hood having a reflecting mirror instead of an eye piece.

According to an aspect of the present invention, there is provided a improved hood for a microscope.

The objects and advantages of the invention will become apparent from the following description of a preferred embodiment of the invention with reference to the accompanying drawing.

FIG. 1 is a full elevational view showing a microscope having a hood according to the invention; and FIG. 2 is a perspective view showing the hood in FIG. 1.

DETAILED DESCRIPTION OF THE PREFERRED EMBODIMENT

Figure 1:
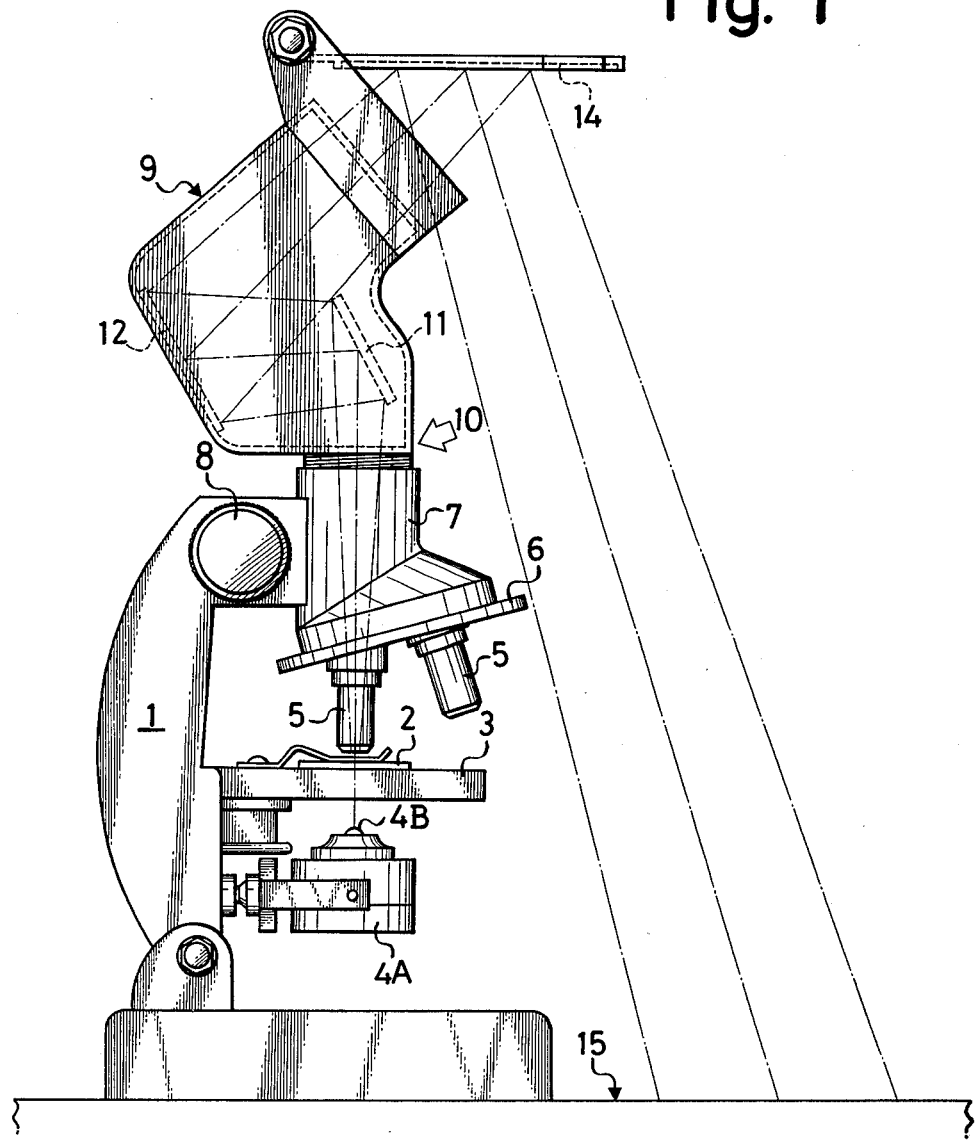
Figure 2:
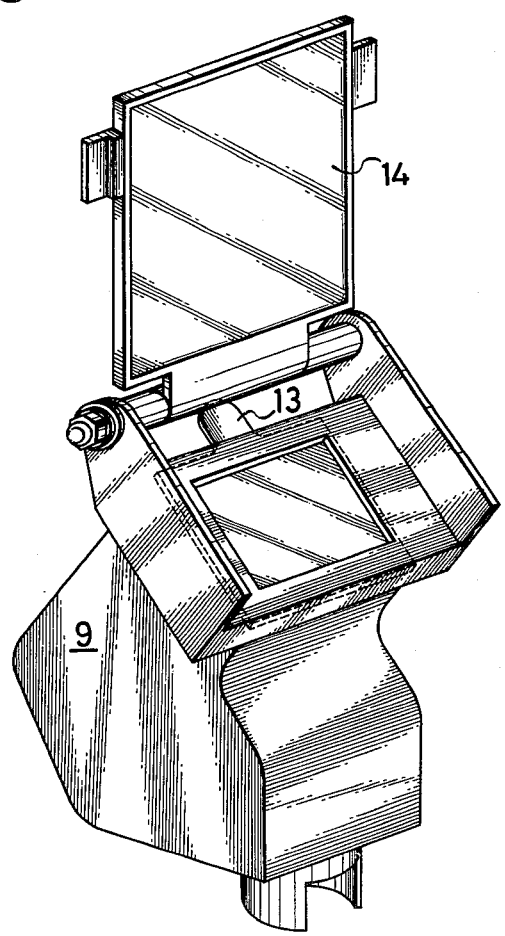

Referring to FIGS. 1 and 2, a microscope body shown at reference numeral 1 which includes, among other things a rest 3 adapted to rest and fix a slide 2 thereon and, a reflecting mirror 4a for projecting a reflecting light on the object to be examined which is arranged on slide 2. On the backside of the reflecting mirror 4A is disposed a lamp 4B. The lamp and mirror assembly may be rotated so as to bring either the lamp or the mirror into use as desired. A changing disc 6 which selectively disposes at one of several object lenses 5 in the generally vertical optical path from the object to be examined, each having a different magnification. A projecting cylinder 7 containing a plurality of of lenses is disposed above disc b an adjusting knob 8 moves the projecting cylinder 7 up and down.

A hood shown at reference numeral 9 is provided with an attachable portion 10 which is adapted to be interposed into an upper opening of the projecting cylinder 7 of the microscope body 1, after the eye piece usually screwed in the opening is removed. The hood includes a plurality of reflecting mirrors 11, 12, and 14 and a removable projecting screen 13.

The projecting screen 13 removed, an image may be easily projected on a table or a stand 15 by means of reflecting the light traveling along the optical path exiting the hood using; mirror 14.

The object to be examined, which is fixed on the preparate or slide 2, disposed in the rest 3, may be illuminated by light beams from the lamp (4B), disposed below the rest 3. (The lamp 4B is turned on by means of a switch not shown which is provided on the frame of the reflecting mirror and which is actuated by inverting reflecting mirror) to face downward as shown in FIG. 1. The light beam, often passing through the examined object, is focused by the objective lens 5 and is reflected at reflecting mirrors 11 and 12 disposed in the hood 9, through the intermediary of a magnifying means formed by a plurality of combined lenses. The light beam may then be projected on the table 15 by the reflecting mirror 14 disposed outside the hood 9 (see FIG. 1).

The reflecting mirrors 11-12 receive light along a vertically oriented path from the objective lens and reflect the light at an approximately 45° angle to the vertical.

Further, according to the invention, it is possible to insert a projecting screen instead in 13 the hood 9 to project the image on the screen. In this case, the reflecting mirror 14 may be rotated on the pin and out of the field of view as shown in FIG. 2.

Since an image can be projected on a table on which a microscope is placed, and if a drawing paper is arranged at the image, the image can be sketched exactly.

Further, since the projection on the table of the image allows many persons simultaneously to observe the image, it is especially advantageous for education in schools.

I claim:

1. A projection hood for a microscope having a vertically orientated optical path from an objective lens, said hood comprising:
   (a) a housing disposed on said microscope, said housing having first and second openings therein;
   (b) reflecting means disposed within said housing for receiving light along the vertically oriented path from the objective lens through said first opening and reflecting said light along a second optical path disposed at approximately 45° angle to the vertical, said second optical path passing through said second opening;
   (c) a projection screen which is removably received on said housing at said second opening; and
   (d) mirror means pivotally mounted on said housing adjacent said second opening, said mirror means being movable in said second optical path passing through said second opening.

2. An apparatus as claimed in claim 1, wherein said reflecting means comprises a pair of spaced parallel mirrors.

3. An apparatus as claimed in claim 1, wherein said housing includes means for temporarily receiving said projecting screen in a plane orthogonal to said second optical path.

4. An apparatus as claimed in claim 3, wherein said projecting screen includes a tab which extends from said receiving means when said screen is received therein.

5. An apparatus as claimed in claim 3, wherein said mirror means is pivotally movable out of said second optical path.

6. An apparatus as claimed in claim 1, wherein said hood includes attachment means for attaching said hood to said microscope and wherein said mirror means is pivotally mounted on an axis orthogonal to said vertically orientated path.

7. An apparatus as claimed in claim 1, wherein said microscope includes a light source for providing the light along said vertically orientated path, said light source being a rotatably mounted mirror and lamp assembly.

* * * * *